Dec. 3, 1935.     R. K. POTTER     2,023,210
ELECTRICAL GAME DEVICE
Filed March 9, 1934     7 Sheets-Sheet 1

INVENTOR,
Ralph K. Potter

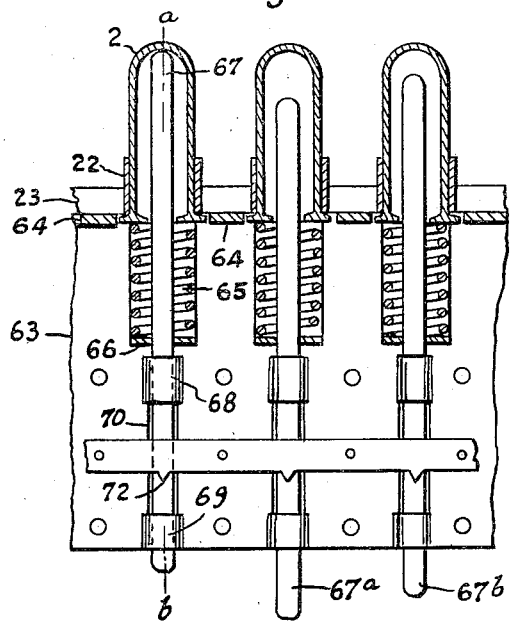
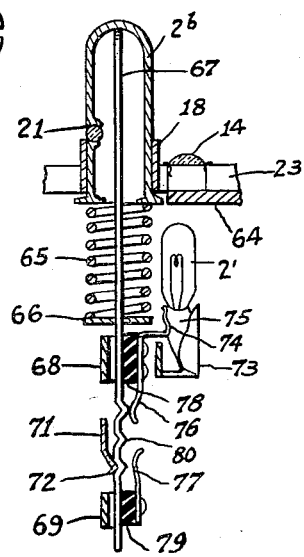
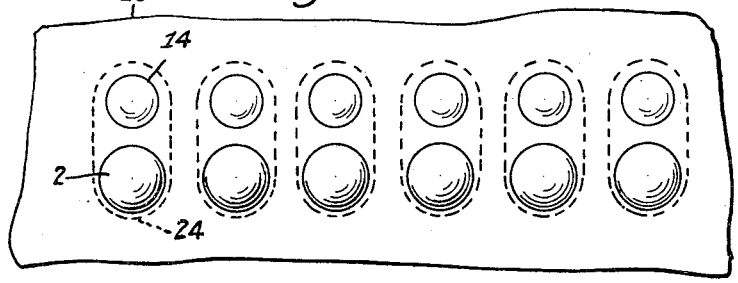
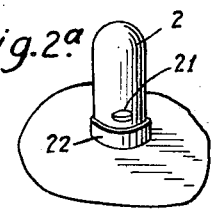
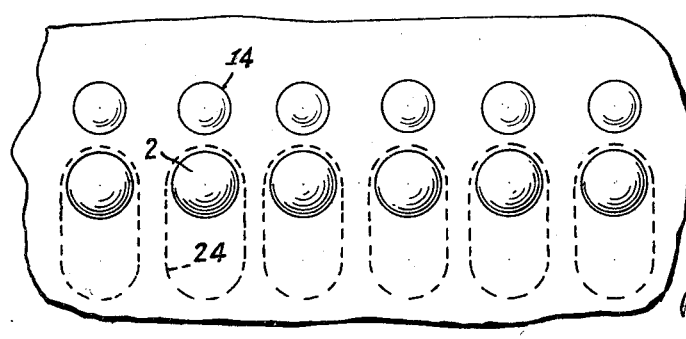
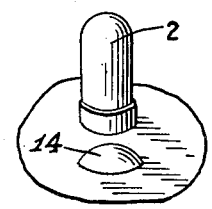

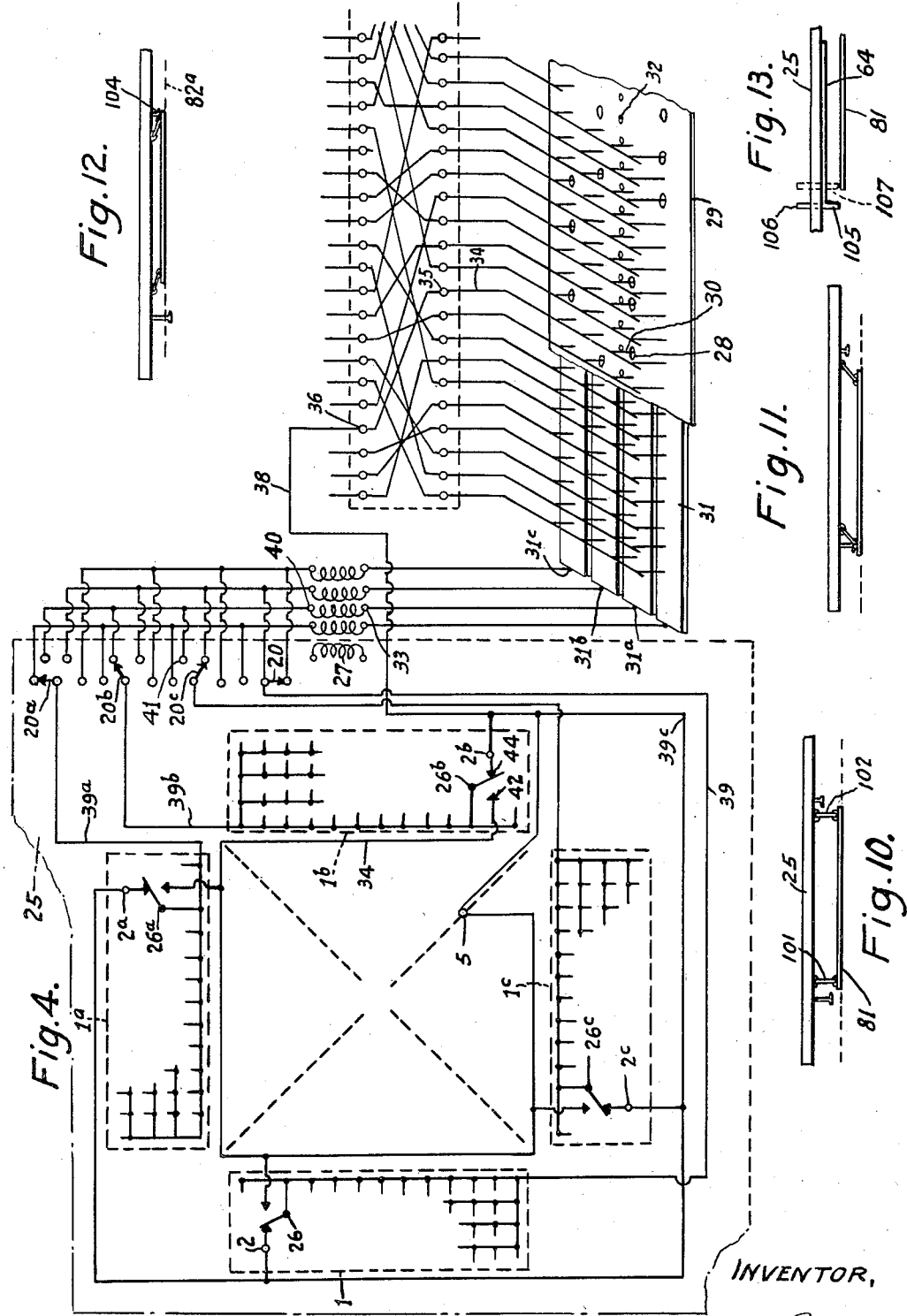

Dec. 3, 1935.  R. K. POTTER  2,023,210
ELECTRICAL GAME DEVICE
Filed March 9, 1934   7 Sheets-Sheet 4

INVENTOR
Ralph K. Potter

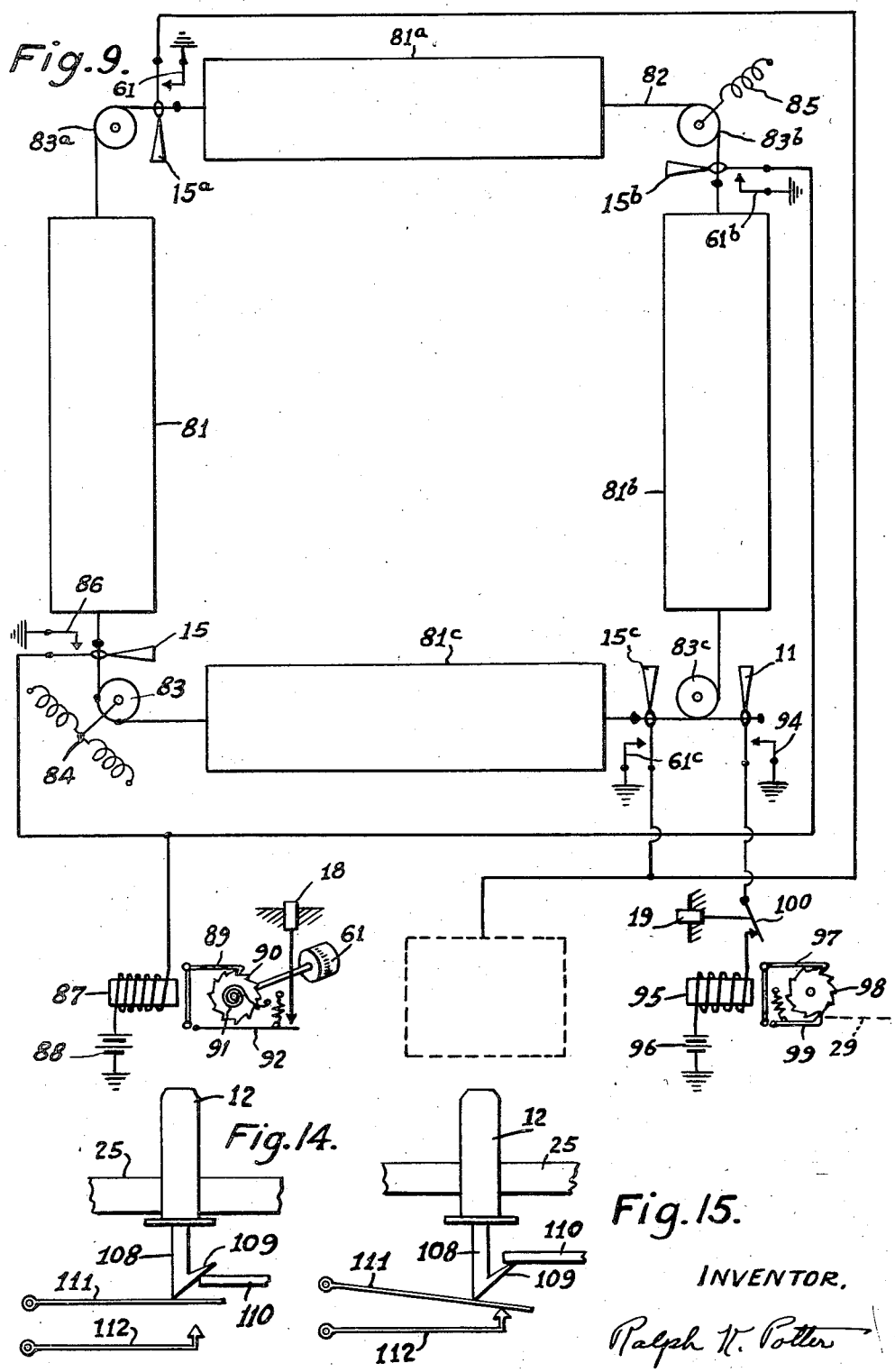

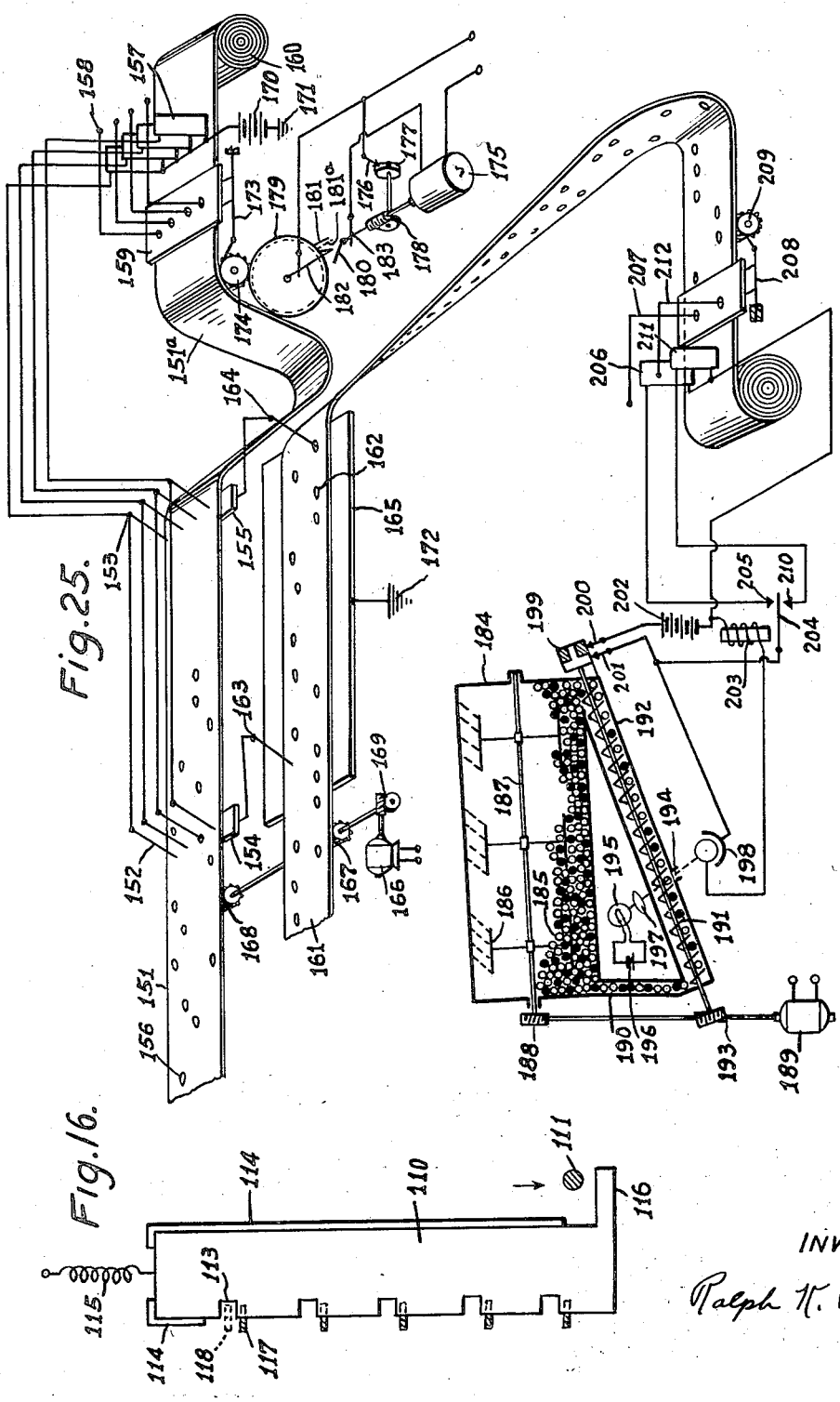

Dec. 3, 1935.                    R. K. POTTER                    2,023,210
                            ELECTRICAL GAME DEVICE
                     Filed March 9, 1934          7 Sheets-Sheet 7
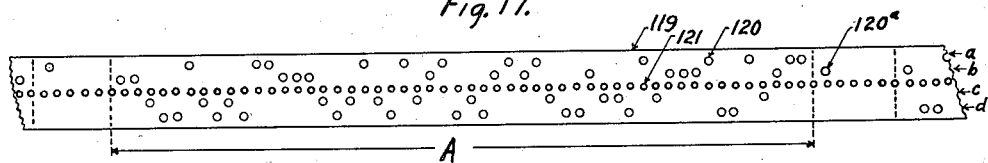
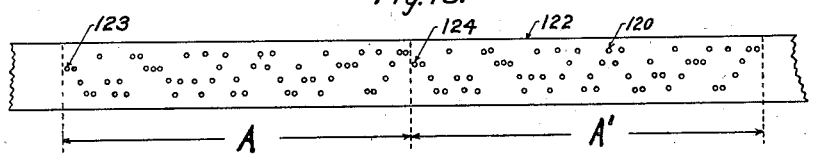
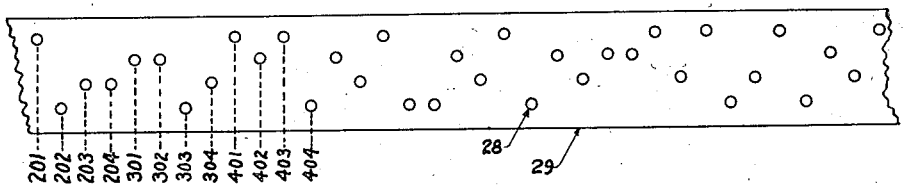
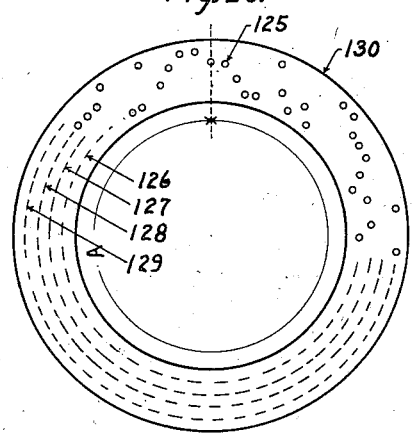
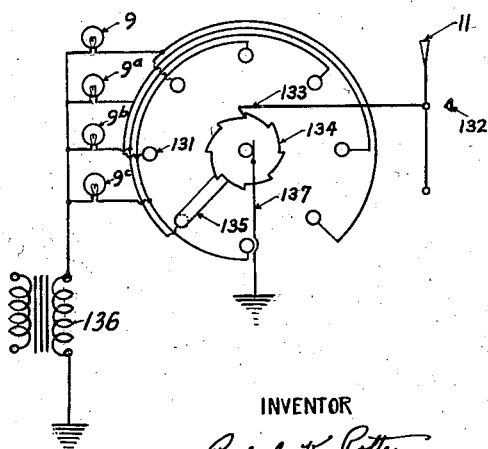
INVENTOR
Ralph K. Potter Patented Dec. 3, 1935

2,023,210

UNITED STATES PATENT OFFICE 2,023,210

ELECTRICAL GAME DEVICE

Ralph K. Potter, Madison, N. J.

Application March 9, 1934, Serial No. 714,765

18 Claims. (Cl. 273—1)

The principal object of this invention is to provide a method and apparatus for playing electrically games of a type that involve an element of chance such, for example, as cards. A further object is to utilize in such a game device a record of previously established distributions of the required kind.

The principal advantages of the invention are that it provides a large variety of essentially random game value distributions, that these values may be distributed quickly and in an orderly manner that permits rapid evaluation, that the number of game values may be increased beyond the number ordinarily used without the manipulation becoming too cumbersome, that in games where values are exposed during play such exposure is orderly so that the played values may be readily recognized, that at stages in the play the distribution may be restored if any question arises concerning the holdings, that duplicate distributions in any number of different playing groups are readily provided, that by the use of a display panel with indicators paralleling those of the game device the play may be followed by a large audience, and that a predetermined distribution of game values may be provided for instructive purposes in games combining chance and skill.

Other objects to be attained and advantages of my invention will be apparent as the description proceeds.

The invention will best be understood by reference to the following detailed description taken with the accompanying drawings. In order to facilitate a better understanding of my invention it is hereinafter described and illustrated in the specific form of an arrangement to play electrically the familiar card game known as "bridge". It will be understood, however, that by varying the number and arrangement of the elements described and the game values assigned to these elements many other games of chance or chance combined with skill may be provided.

Of the annexed drawings,

Fig. 2a represents one view of a combined playing button switch and indicator.

Fig. 2b is another view of the button indicator.

Figs. 3a and 3b illustrate the operation of the dummy indicator.

Fig. 4 shows the circuit of the game device.

Fig. 8 is a sectional elevation of several of the button indicators.

Fig. 8a is a sectional elevation of one of the button indicators taken at right angles to the view shown in Fig. 8.

Fig. 8b is a plan view of one of the button indicators.

Fig. 9 shows the arrangement for restoring the button indicator switch and electrical circuits associated therewith.

Figs. 10, 11, and 12 illustrate the operation of the restoring mechanism.

Fig. 13 shows the means for preventing operation of the full restoring lever while a dummy slide is open.

Figs. 14, 15, and 16 show the trump indicator button mechanism and release arrangement.

Fig. 17 shows a section of perforated distributor tape record.

Figs. 18 and 19 illustrate alternative types of distributor record tape.

Fig. 20 illustrates a disk or endless belt form of distributor record.

Fig. 21 shows means for indicating the dealer's position.

Fig. 22 shows a grid form of cross-connecting bank.

Figure 23:
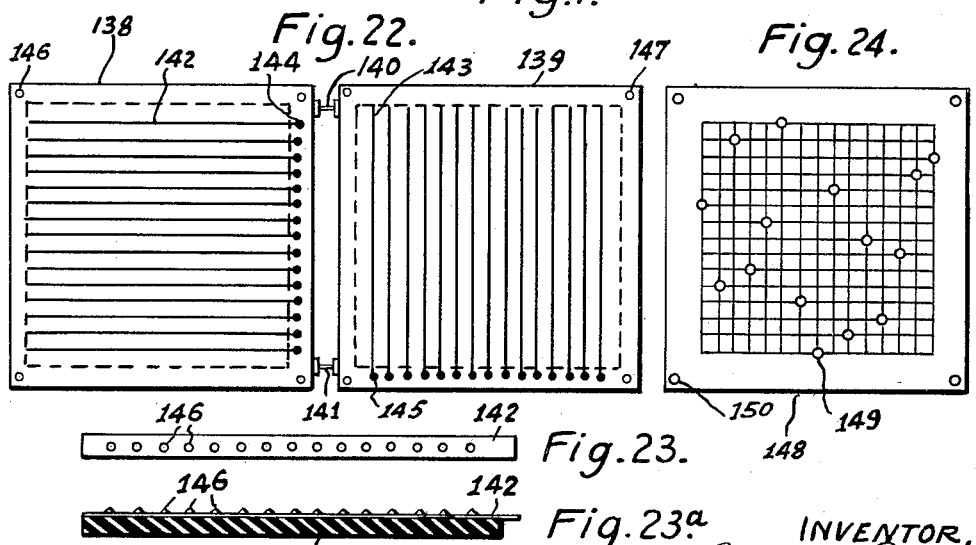

Fig. 23 illustrates the detail in plan of a form of conductive element for use in the grids shown in Fig. 22.

Fig. 23a is a sectional elevation of the conductive element shown in Fig. 23.

Fig. 24 shows a sheet of perforated paper or other insulative material used between the grids of Fig. 22 to establish electrical connections between elements of the grids.

Fig. 25 illustrates means for producing distributor tape records for use in the electrical game table.

Figure 1:
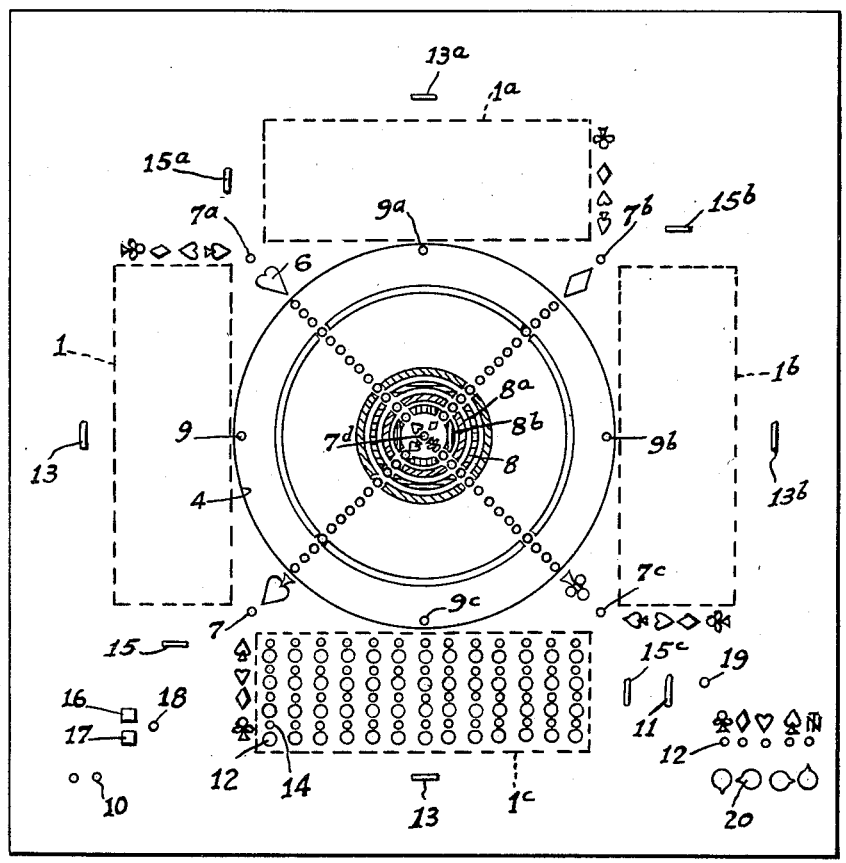
Fig. 1 shows the top of an electrical bridge table.

Referring now to Fig. 1 which illustrates the external appearance of an electrical game table of a kind designed for use in playing the familiar game of bridge, 1, 1a, 1b, and 1c are the player panels situated in front of the four players' positions. In each of these player panels are fifty-two buttons 2 arranged in four rows of thirteen as shown in panel 1c. The suits are indicated by symbols 3 opposite the rows of buttons. In the center of the table included by circle 4 is the playing panel containing fifty-two indicating lamps 5 arranged in four radial rows corresponding to the four suits. At the end of each row is a symbol 6 indicating the suit and beyond this symbol at the end of each row are indicator lights 7, 7a, 7b, and 7c that show the trump suit. In the center of the playing panel is the "no trump" indicator light 7d. The rings 8, 8a, and 8b are concentric colored bands provided to facilitate identification of the game exposed values. Indicator lights 9, 9a, 9b, and 9c provide automatic indication of the dealer's position. In order that the reader may more readily comprehend the function of the remaining parts shown in Fig. 1 they will be described as they would be used in the course of play. With the four players in position opposite the four player panels 1, 1a, 1b, and 1c the power switch 10 is turned on. When the knob 11 is moved to the right, thirteen of the fifty-two button indicators 2 on each player panel will show an inset spot of illumination on the side of the button toward the player. The buttons thus illuminated indicate game values that are revealed only to the player to which they are assigned. At the same time one of the indicator lights 9, 9a, 9b or 9c indicates that a player at that position has the first bid. At the conclusion of the bidding the appropriate button in the button bank 12 is pressed lighting a trump indicator 7, 7a, 7b or 7c to show the trump suit. The player opposite the highest bidder pushes forward a dummy knob 13, 13a, 13b or 13c exposing his holdings by uncovering small apertures 14 in front of all the buttons in that player panel. The player to the left of the highest bidder then presses a button on the player panel in front of him corresponding to the game value which he wishes to play and a light 5 appears on the central playing panel indicating by its position and marking the game value played. The following players expose game values similarly. If a player presses a button that is not illuminated no light will appear on the central playing panel. The trick is "taken" by moving a trick knob 15, 15a, 15b, or 15c to one side and simultaneously the lights on the central playing panel disappear. Movement of the trick release knob numerically registers a trick on trick indicators 16 or 17. When all of the buttons have been played the dummy knob is pulled back and the deal knob 11 moved to redeal. Movement of deal knob 11 also releases the trump button in the button bank 12. When the score is written down button 18 is pressed to restore trick indicators 16 and 17. The original distribution may be restored after completion of the hand by pressing button 19 while deal knob 11 is moved to one side. Any one hand may be made to appear on all of the player panels by turning pointers on the switch knobs 20 to a similar position, or the subsequent distribution of hands to the different players may be changed by turning each of these pointers to different positions.

In Fig. 2a I have shown a view of the playing button as seen from the player's position with the small indented aperture 21 through which a directionally visible indication appears to that player when the indicator is energized. Button indicator 2 is operated by depressing it within sleeve 22. In Fig. 2b is a reversed view of the button indicator assembly showing the dummy aperture 14.

Fig. 3a is a partial view of the player panel showing the elongated apertures 24 of the dummy slide beneath the panel surface 23 delineated by broken lines. In this position dummy apertures 14 are opened so that any illumination from the indicator lights situated beneath is visible. In Fig. 3b the elongated aperture 24 is moved to a position in which the dummy aperture 14 is closed.

In Fig. 4 the broken line 25 represents an outline of the table top upon which the game device is mounted and the player panels are shown by the rectangular broken line enclosures 1, 1a, 1b, and 1c. In order that the diagram may not be unnecessarily complicated only one indicator circuit of the fifty-two required is shown. Except for certain common conductors that will be specifically identified all the others are electrically the same. Where a perforation 28 occurs in the insulative tape 29 the distributor contacts 30 touch group contact bars 31, 31a, 31b, or 31c thus establishing an electrical circuit through the power source 27, and one of the button indicators 2, 2a, 2b, or 2c. Starting at terminal 33 of the transformer 27 the circuit as shown is through group contact bar 31a to contact point 30, along contact point support 34 forming one element of the contact bank which includes the fifty-two elements of this type required, through terminals 35 and 36 of the cross-connecting terminal bank enclosed by the broken line 37, along the conductor 38 to button indicator 2b, switch 26b, conductor 39b, switch 20b and finally to the upper terminal 40 of transformer 27. Perforation 28 will not energize any of the remaining indicators since the return circuit from these is through group contact bars 31, 31b, and 31c that are insulated from bar 31a. Perforation 28 will, however, energize one of the other button indicators such as 2c if, for example, the switch 20c is moved to contact 41. Then both 2b and 2c will be illuminated simultaneously. The series of electrically associated button indicators 2, 2a, 2b, and 2c represents a particular game value such, for example, as the nine of spades. Perforation 28 would in this case assign the nine of spades to player panel 1b. By changing the position of the switches 20, 20a, 20b, and 20c the assignment may be changed to any other player panel, or if the cross-connections 35 and 36 are changed any other perforation along the tape may be responsible for the assignment of the nine of spades taken as an example. We shall return to a consideration of the electrical manipulation which occurs when a player plays an indicated game value by depressing a button indicator such as 2b. The blade of switch 26b is moved to make connection with contact 42 breaking the circuit through button indicator 2b and completing a circuit around through conductor 43, indicator 5 which is visible to all the players and conductor 38 which connects to terminal 36. To subsequently extinguish indicator 5 without energizing button indicator 2b switch blade 26b is returned to a position midway between contacts 42 and 44. The conductor 38 and associated button indicators 2, 2a, 2b, 2c, and indicator 5 are duplicated fifty-two times to provide the number of game values required in the game of bridge. Within the player panels the conductors 39, 39a, 39b, and 39c, respectively, are common to all of the duplicated circuits not shown to avoid confusion.

Figure 5:
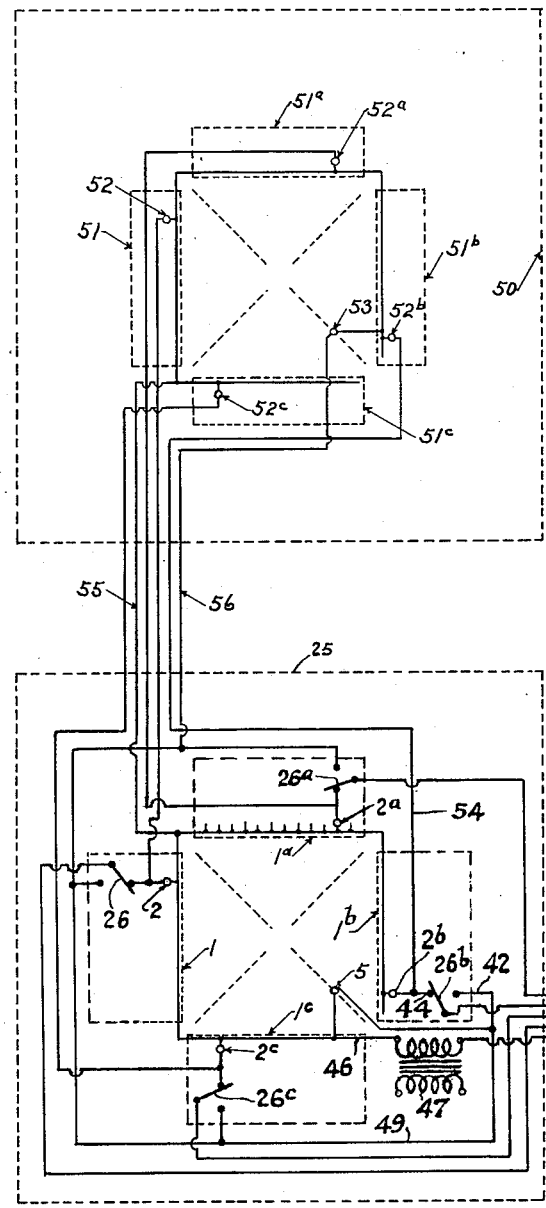
Fig. 5 illustrates a modified circuit arrangement and a display board.

In Fig. 5 is a modified circuit arrangement for the electrical bridge game device. Except for a common return conductor fifty-two groups of circuits as shown are required for the complete bridge game device. Conductors 45, 45a, 45b, and 45c are associated with switch blades 26, 26a, 26b, and 26c, respectively, and the separate contact points 30 of the distributor contact bank. The return circuit 46 from the button indicators 2, 2a, 2b, and 2c, and indicator 5 passes through the secondary winding of transformer 47 which supplies electrical power and is connected to the common contact bar 48. Perforation 28 in tape 29 here completes a circuit through the contact point 30, conductor 45b, switch 26b, button indicator 2b, common return conductor 46, transformer 47, and common contact bar 48. As in Fig. 4 movement of the blade of switch 26b from contact 44 to contact 42 transfers the game value indication to the indicator 5 on the playing panel by completing a circuit around through conductor 49, indicator 5 and conductor 46. Moving the blade of switch 26b to a position midway between the contacts 42 and 44 leaves both indicators inoperative.

In the upper part of Fig. 5 is a display board 50 paralleled electrically with the playing table 25 for the purpose of permitting an audience to follow the play. Panels 51, 51a, 51b, and 51c are similar to panels 1, 1a, 1b, and 1c, respectively, and the central playing panel of table 25 is duplicated. Distribution of all game values on table 25, including those concealed and exposed, is revealed to the audience by lights or other suitable indicators. When, for example, a circuit is completed through the perforation 28 and button indicator 2b in the manner already described a parallel circuit is completed through conductor 54, indicator 52b and the common return conductor 55. When the game value represented by button indicator 2b is played so that indicator 5 is energized a parallel circuit is completed through common conductor 46 on table 25 and common conductor 55 to the display board 50, indicator 53, return lead 56 and conductor 49. Such a display board arrangement may obviously be applied as well to the circuit arrangement of Fig. 4 since it only involves putting indicators of the display board in parallel with similar indicators on the playing table. Where large display panels are used it may be advisable to use relays to energize the display panel indicators.

Figure 6:
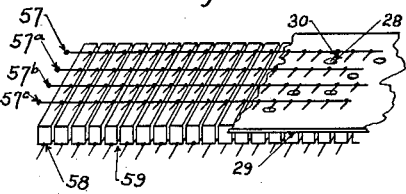
Figs. 6 and 7 show modified forms of the distributor contact bank.

Fig. 6 shows a modified form of distributor contact bank utilizing point contacts 30, divided electrically into groups 57, 57a, 57b, and 57c. These make contact through perforations 28 of the insulative tape 29 with contact bars 58 arranged at right angles to the length of tape 29 and insulated at 59.

Figure 7:
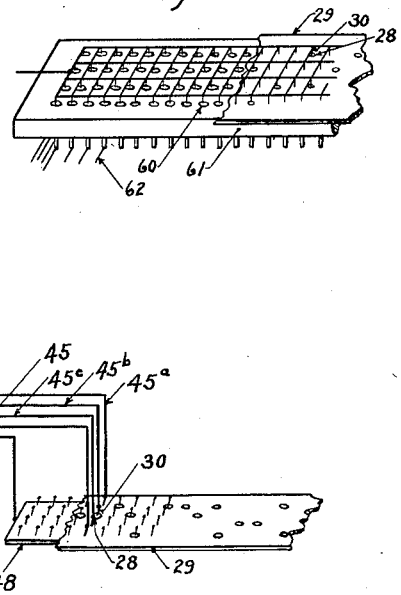

Fig. 7 shows a further modification of the contact bank in which all point contacts 30 are connected together and electrical connection through perforation 28 of the insulative tape 29 is made with conductive element 60 set in insulative material 61 so that a separate connection 62 may be made to each associated indicator.

In Fig. 8 a section of the button indicator 2 is shown. The button has a flange slotted as shown by the top view 2a so that it does not turn as it moves downward into a rectangular seat cut in the switch mounting plate 63. The button indicator 2 is supported in an upright position by sleeve 22 set into the panel top plate 23 beneath which is dummy slide 64. The button is returned to its normal position after being depressed by spiral spring 65 seated upon washer 66. A metal switch rod 67 is set into recesses 68 and 69, pressed into the switch mounting plate 63 and separated by a rectangular opening 70. Spring strip 71 has fingers 72 that exert a restraining pressure upon switch rod 67. Thirteen such button indicator units are supported by the mounting plate 63. The button 2b is a section a—b as of button indicator 2. A colored bead set into the indicator aperture 21 is visible to the player when the button interior is illuminated by the light 2'. Dummy aperture 14 is also illuminated by light 2' when dummy slide 64 permits. Light 2' sets in supports 73 and 74 and connection is made to sides of the base 75. Contact springs 76 and 77 are insulated from switch mounting plate 63 by strips 78 and 79. Crimped portion 80 of switch rod 67 touches contact 76 when the rod is up and contact 77 when down. Normally switch rod 67 is in the upper position and light 2' will then be lighted if contact is completed through a distributor tape perforation. Pressing button indicator 2 moves the switch rod 67 to the position of 67a extinguishing light 2' and contacting with 77 so that a light appears on the central playing panel. This is in turn extinguished when the switch rod is returned to the midway position, illustrated by switch rod 67b. The means by which this partial return and the complete return of the switch rod to its upper position is accomplished will now be described in connection with Figs. 9 to 12, inclusive.

In Fig. 9 the restoring plates 81, 81a, 81b, and 81c are shown in the absence of the associated player panels and switches beneath which they are supported. To function as required these restoring plates are moved simultaneously by steel ribbon 82 running over pulleys 83, 83a, 83b, and 83c. When moved to one side by the trick restore levers 15, 15a, 15b, and 15c the plates are returned to the normal position by spring arrangement 84. Tension is maintained in steel ribbon 82 by spring 85. Lever 11 is capable of moving the panels in a direction opposite to movement by the trick levers. Operation of trick lever 15 completes a circuit through contact 86, relay 87, and battery 88 moving catch 89 which turns ratchet wheel 90 one notch against the action of spiral spring 91 so that the numbered drum 16 registers an additional trick. Operation of trick lever 15b activates the same trick indicator drum 16 since the electrical connections are paralleled. When release button 18 is pressed releasing catch 92 drum 16 is restored by spiral spring 91. Associated with trick restore levers 15a and 15c is a mechanism 93 for recording tricks identical to that so far described. Operation of lever 11 closes contact 94, completes the circuit through relay 95 and battery 96 causing catch 97 to move ratchet wheel 98 one notch where it is held by catch 99. On the shaft with this ratchet wheel is a toothed wheel engaging perforation in distributor tape 29 so that the tape is moved the required amount. To restore the hand without moving tape button 19 is pressed to open spring contact 100 thus making relay 95 inoperative when the deal lever 11 is moved.

In Figs. 10, 11, and 12 I have illustrated the way in which the restoring plates of Fig. 9 lift the switch rods. In Fig. 10 the restoring plate 81 is suspended in its normal position from the table top 25 by links 101 and 102. Fig. 11 shows restoring plate 81 moved to the left and upward to stop 103 by tension upon steel ribbon 82. This lifts the switch rods to the midway position. Fig. 12 shows the restoring plate 81 moved to the right and upward to stop 104 by tension upon steel ribbon 82a. This fully restores the switch rods.

In Fig. 13 I have shown the means by which action of lever 11 is prevented when the dummy slide is open. The restoring plate 81 is shown in position beneath table top 25. Dummy slide 64 is shown in the normal closed position by the full line illustration. When moved forward by pushing part 106 flange 105 takes the position 107 which limits the upward movement of restoring plate 81 to that required for the trick restoring operation.

Figs. 14, 15, and 16 show the way in which the trump buttons 12 of Fig. 1 are operated and restored. In Fig. 14 button 12 through table 25 is held upward by spring contact 111. In Fig. 15 button 12 is depressed so that flexible extension 109 bears against the lower surface of plate 110 and spring contact 111 touches contact 112. Fig. 16 shows how button 12 of Fig. 15 is released. Along one edge of plate 110 which is held in position by guide 114 and spring 115 are notches 113. The normal position of the lower part of button 12 in Fig. 15 is shown here as 117. When the buttons are depressed catch 109 is held beneath plate 110 but when lever 11 shown in section is moved as indicated it engages extended part 116 of plate 110 moving the plate so that button catch 109 is effectively displaced to position 118 and the button is released.

In Figs. 17, 18, and 19 I have shown three forms of perforated distributor record for use in the electrical bridge table herein described. The purpose of the perforated distributor tape is to provide essentially random distributions of the game values. The bridge game requires a distribution of fifty-two different values among four players and it is convenient for the position of perforations along the tape to represent different game values and that across the tape the group assignment. It is important to bear in mind that the position of a perforation has in fact no real game value significance unless the connections to the various indicators in the electrical bridge table and to the groups of these devices are known. The perforated tape only provides a record of distributions of a required kind such as ($x$) different things being divided among ($y$) groups in a wide variety of ways. Fig. 17 shows a simple form of perforated distributor tape 119 which within interval (A) contains thirteen perforations 120 in each of four rows (a), (b), (c) and (d) along the tape. Perforations 120a outside of interval (A) are used, for example, to indicate the dealer's position and perforations 121 are provided to move the tape.

In Fig. 18 is a modified form of the tape record shown in Fig. 17 with the tape drive perforations left out to simplify the picture. Here there are two duplicate arrangements of perforations 120 in intervals (A) and (A') of tape 122. With the distributor contact bank covering an interval (A) one distribution of game values is affected. When the tape is moved to the left one perforation interval a perforation 123 becomes ineffective and is replaced by another perforation 124. Each such movement of the contact bank by one perforation interval results in a new game value distribution so that fifty-two different hands are provided within the intervals (A) and (A'). Furthermore the tape movement to redeal is much reduced.

In Fig. 19 is shown a further modification of the perforated tape record again without the tape drive perforations. If, for example, perforations of tape 122 in Fig. 18 were separated by four times the interval required three other unrelated game value distributions could be inserted in this space. The perforations 28 in tape 29 of Fig. 19 are arranged in this interspaced fashion. For one position of the contact bank connection is made through perforations 201, 301, 401, and others following at equal intervals. When the tape is moved one perforation interval connection is made through perforations 202, 302, 402, and others following at equal intervals. Further movement of the tape makes effective the perforations 203, 303, 403, and those following at equal intervals. With five perforations per inch about seven feet of tape would thus provide over two hundred deals.

If from the tape of Fig. 17 a length is cut to include one deal and the ends brought together to form a belt this small belt will provide fifty-two different game distributions. An endless record of this kind is illustrated in Fig. 20 where-in the perforations 125 are distributed along the four broken lines 126, 127, 128, and 129.

In Fig. 21 I have shown the arrangement of the circuit to indicate the dealer's position. Dealer indicator lights 9, 9a, 9b, and 9c are connected to contact points 131 as shown. When lever 11 is moved to stop 132 catch 133 turns ratchet wheel 134 and contact arm 135 steps to the next switch contact point. A circuit is then completed through the indicator light associated with that contact and the power source 136.

I shall now describe a modification of the cross-connecting block 37 of Fig. 4 to permit repeated use of a comparatively short endless distributor record of the type shown in Fig. 20. In Fig. 22 are shown two insulative plates 138 and 139 connected by hinges 140 and 141 so that when plate 138 is closed over upon plate 139 they fit together in accurate alignment. On plate 138 are contact strips 142 arranged as shown and insulated electrically. On plate 139 are similar contact strips 143 arranged at right angles to those of plate 138. Flexible leads may be connected to terminals 144 of plate 138 and terminals 145 of plate 139. Raised corner pins 146 of plate 138 that fit holes 147 of plate 139. Fig. 23 shows the detail of contact strips 142 and 143 in Fig. 22. The contact strip 142 has raised areas 146 and is mounted upon a flexible insulative material 147. In Fig. 24 is shown an insulative sheet 148 with perforations 149 so distributed that when it is placed between plates 138 and 139 of Fig. 22 and aligned by corner holes 150 electrical contact is formed between contact strips of the two grids to provide interchangeable connection between the terminals of the grids. With the fifty-two contact strips required for a bridge game device the perforations may be arranged in a very wide variety of ways, and each sheet provides eight different cross-connecting arrangements by turning it into four different positions on each side.

In Fig. 25 is shown that part of the invention which provides the perforated distributor tape record employed to distribute the game values in an essentially random manner. Insulative tape 151 from roll 160 passes beneath contact banks 152 and 153 that make contact with bars 154 and 155, respectively, when perforations 156 permit. Individual pairs of contacts in the banks 152 and 153 connect with individual solenoids 157 of four tape perforating devices 158 as shown. These perforators may be any one of several types familiar in telegraph practice. Shuffling tape 161 contains perforations 162 that appear at regular intervals in one or the other of two rows along the tape as determined by a method of random distribution between the rows which will be described later. Perforations in one row permit connection through point 163 and plate 165 while perforations in the other row permit connection to this plate through point 164. Tapes 151 and 161 are moved at the same rate by motor 166 driving toothed wheels 167 and 168 through gear 169. Contacts 163 and 164 are separated by the same perforation interval as contacts 152 and 153. When a perforation comes simultaneously under contact bank 152 and contact 163 an electrical circuit is completed through a particular perforator solenoid, the battery 170 and ground connections 171 and 172 so that a perforation is registered on tape 151. Perforator arm 158, being forced downward through the tape guide 159 and the paper, moves the spring arm of catch 173 downward and its return movement turns tape drive wheel 174 moving tape 151 ahead one perforation interval. Contact banks 152 and 153 space the number of perforations required for one deal which in the bridge game here described would be fifty-two. Fifty-two perforations first pass contact bank 153 and then bank 152. Shuffling tape 161 moving with tape 151 causes certain of the fifty-two perforations to be registered by contact bank 153 and those remaining by bank 152. Tape passing the perforator moves unsteadily so that a long slack interval 151a containing several deals is provided. A familiar way to shuffle cards in a game is to cut the cards into two groups and flip them together so that they are mixed at random. The same principle is here applied electrically in a reverse sense, the cards being effectively removed from the pack at random to form two groups that are then arranged side by side.

Each fifty-two perforations on tape 151 is followed by a blank interval so that contact banks 152 and 153 do not record simultaneously. For this purpose motor 175 starts and moves the tape steadily forward for a suitable interval after each fifty-two perforations. Contact point 176 normally rests upon a small insulative segment of rotary contactor 177 connected to the motor shaft by gears 178. When an open circuit between contact 176 and rotary contactor 177 is shorted motor 175 starts and continues to run until the insulative segment of contactor 177 again comes under contact point 176 so that gear wheel 179 moves the tape the required distance. At the end of this operation right angle arm 180 on the motor shaft rests against an insulative strip 181a on the crank arm attached to gear 179. Fifty-two perforations of tape 151 turn gear 179 so that conductive side 181 of the crank arm shorts the open circuit from contact 176 to rotary contactor 177 through contacts 182 and 183 which again starts the motor. The way in which the shuffling tape 161 is perforated will now be described. Cylindrical receptacle 184 contains a large and roughly equal number of transparent and opaque balls 185 of the same size and weight that are mixed by stirring arms 186 on shaft 187 driven through gears 188 by motor 189. The balls drop into tube 190 and are carried to worm conveyer 191 in housing 192 and driven through gears 193 by the motor 189. A light beam from source 195 energized by battery 196 passes through lens 197, an opening 194 in the conveyer housing and enters light sensitive cell 198. When a ball passes opening 194 the rotating contactor 199 on the conveyer shaft shorts contacts 200 and 201. If the ball is transparent so that light reduces the resistance of cell 198 relay 203 will be operated by battery 202 and armature 204 will touch contact 205 completing a circuit through perforator solenoid 206 thus operating perforator arm 207. Spring catch 208 is depressed by arm 207 and on its return stroke moves the tape drive wheel 209 ahead one perforation interval. An opaque ball will not operate relay 203 so that solenoid 211 connected to battery 202 will operate perforator arm 212 and step the tape along one perforation interval as before described. Thus each time a transparent ball passes opening 194 a perforation is made in one half of tape 161 and each time an opaque ball passes this opening a perforation is made on the other half. The position of successive perforations is accordingly determined by a random means. To start the shuffling device one or more complete groups of perforations representing as many deals are punched by hand so that there are thirteen successive perforations in one row followed by thirteen in the next row and so on. Thereafter the shuffling device will carry on indefinitely to produce a wide variety of game value distributions. It is preferable from a manufacturing standpoint to subsequently use the perforated tape 151 as a master tape fed into other perforating machines arranged to produce a large number of tapes of the duplicated and interspaced type for general distribution.

It will be recognized that many variations in construction and arrangement of the devices thus far described as parts of my invention may be made by those skilled in the art, without departing from the spirit of my invention or the scope of the appended claims, and that furthermore many games, other than the one specifically described requiring different game values and different distributions and ways of exposing these game values, may be devised by employing the principles of the invention herein described and claimed. Moreover various changes may be made in the described methods of making and utilizing records of previously performed distributions or shufflings. For example, the perforated tape described as the distributor record may be replaced by any of several types of record well known to those familiar with arrangements for reproducing code signals or affecting other switching sequences in the electrical art.

What I claim is:

1. In a game device the combination comprising a plurality of electrical indicators each of said indicators being marked or otherwise identified to represent game values, a source of electrical power, distribution means comprising perforations arranged positionally in insulative material to represent a variety of combinations of a predetermined type, switching means so actuated by said distribution means as to connect a predetermined number of said indicators to said source of power.

2. In a game device the combination of a plurality of primary indicators, a plurality of secondary indicators, said primary and secondary indicators being identified with game values, a source of electrical power, distribution means comprising perforations in insulative material, a first switching means so actuated by said distribution means as to selectively connect a plurality of said primary indicators to said source of power, a second switching means whereby electrical power supplied to one of said primary indicators may be utilized to operate an associated secondary indicator.

3. The combination in a game device comprising a plurality of primary electrical indicators arranged in a plurality of groups associated with player positions, said primary indicators within each group being directively exposed to the associated player position, a source of electrical power, distribution means comprising perforations in insulative material, a first switching means actuated by said distribution means so as to selectively connect a desired number of said primary indicators to said source of power, a plurality of secondary indicators, and second switching means whereby power supplied to any one of said primary indicators may be utilized to operate one of said secondary indicators.

4. In a game device the combination comprising a plurality of electrical indicators forming a primary group, a plurality of indicators forming a secondary group, said indicators within said primary group being marked or otherwise identified with the same game values as are represented by the indicators forming said secondary group, a source of electrical power, distribution means comprising perforations in a band of insulative material, a first switching means so actuated by said distribution means as to connect a predetermined number of said indicators within each of said groups to said source of power, a second switching means connected to said indicator groups in such a way that power supplied to said primary indicators may be caused to actuate associated secondary indicators.

5. In a game device the combination comprising a plurality of electrical indicators forming a player group, a plurality of electrical indicators forming a display group, said indicators within said display group being marked or otherwise identified with the same game values as are represented by the indicators forming said player group, a source of electrical power, distribution means comprising perforations in insulative material, a first switching means so controlled by said distribution means as to selectively connect certain of said indicators within each of said groups to said source of power, the indicators so connected being representative of the same game values in both of said groups, a second switching means whereby electrical power supplied to a predetermined number of said indicators in said groups may be transferred to other indicators in said groups.

6. In a game device the combination comprising a plurality of primary electrical indicators arranged in a plurality of groups according to player positions, said primary indicators within each group being directively exposed to the player position with which it is associated and screened from the remaining player positions, a source of electrical power, distribution means comprising perforations in insulative material, a first switching means so actuated by said distribution means as to connect a plurality of said primary indicators to said source of power, a plurality of secondary indicators, second switching means whereby power supplied to any one of said primary indicators may be applied to operate at will an associated secondary indicator, and restoring means whereby said secondary indicators so operated may as desired be made inoperative or said second switching means restored to the initial condition.

7. In a game device the combination comprising a plurality of electrical indicators each of said indicators being marked or otherwise identified with a game value, a source of electrical power, and switching means to connect a predetermined number of said indicators to said source of power, said switching means comprising two groups of contact members with a perforated sheet of insulative material interposed therebetween.

8. In a game device the combination comprising a plurality of game value indicators arranged in a plurality of groups, each indicator within one of said groups being marked to represent a different game value and each of said groups containing indicators that are similarly marked, a source of electrical power, and switching means to connect a predetermined number of said indicators in each group to said source of power, said switching means comprising a plurality of contact switches and a perforated band of insulative material.

9. In a game device the combination comprising a plurality of game value indicators each of said indicators being marked or otherwise identified with a game value and representative of a game value assignment when actuated, a source of electrical power, and switching means to connect a predetermined number of said indicators to said source of power, said switching means comprising a plurality of movable switches and a perforated band of insulative material so arranged in operative relation therewith as to be capable when moved of selectively operating said switches.

10. In a game device the combination comprising a plurality of electrical indicators each of said indicators being marked to represent a game value, a source of electrical power, switching means to connect a desired number of said indicators to said source of power, and means for determining the operation of said switching means, said determinant means comprising a perforated band of insulative material.

11. A game device comprising a plurality of electrical indicators, said indicators denoting game values, a source of electrical power, a switching means to connect said indicators to said source of power, said switching means comprising two groups of contact members, a switching determinant comprising a perforated band of insulative material, said determinant being capable of operating said switching means when interposed between said groups of contact members and moved in relation thereto.

12. The combination in a game device of a plurality of electrical indicators representative of game values, a source of electrical power, a switching means to selectively connect said indicators to said source of power, a switching determinant comprising a perforated band of insulative material, said determinant being capable of selectively operating said switching means when moved in relation thereto, and means for moving said switching determinant at will to so operate said switching means.

13. In a game device, a plurality of electrical game value indicators each of said indicators being marked or otherwise identified with a game value, a source of electrical power, a record of game value distributions comprising a band of insulative material with perforations positionally arranged to represent said distributions, a switching means capable of being actuated by said record as a determinant to connect a desired number of said indicators to said source of power.

14. In a game device the combination comprising a plurality of electrical game value indicators each of said indicators being marked or otherwise identified with a game value, a source of power, a switching means to connect a desired number of said indicators to said source of power in a predetermined sequence, the indicators comprising said number being selectively determined both by said switching means and by circuit means between each of said indicators and said switching means, means for interchanging said circuit means comprising two groups of contact elements with a perforated sheet of insulative material interposed therebetween.

15. A game device comprising a plurality of primary electrical indicators arranged in groups that are associated with player positions, said primary indicators within each group being directively exposed only to the player position with which it is associated, a source of electrical power, distribution means comprising a band of insulative material with perforations, a first switching means so actuated by said distribution means as to connect indicators determined by said perforations to said source of power, a plurality of secondary indicators, second switching means whereby power supplied to any one of said primary indicators may be caused to operate at will a secondary indicator, restoring means associated mechanically with said switching means to make inoperative said secondary indicators so operated or to restore said switching means to an initial condition, and indicating means operatively associated with said restoring means so as to indicate successive operations of said latter means.

16. In a game device the combination comprising a plurality of electrical indicators each of said indicators being identified with a game value, a source of electrical power, distribution means comprising a plurality of contact points associated with said indicators and said source of power and a sheet of material with configurations formed therein so as to selectively engage said contact points and connect a predetermined number of said indicators to said source of power in accordance with the positional arrangement of said configurations.

17. In a game device the combination comprising a plurality of electrical indicators each of said indicators being marked or otherwise identified with a game value, a source of electrical power, a distribution means comprising a first bank of contacts and a second bank of contacts with a contact determinant interposed therebetween, said contact determinant comprising a sheet of material with conductive areas whereby a predetermined number of said indicators are selectively connected through contacts in said banks to said source of power.

18. The combination in a game device comprising a plurality of primary electrical game value indicators arranged in a plurality of groups associated with player positions, said primary indicators within each group being directively exposed to the associated player position, a source of electrical power, distribution means comprising perforations in insulative material, a first switching means actuated by said distribution means so as to selectively connect a desired number of said primary indicators to said source of power, a plurality of secondary indicators, second switching means whereby power supplied to any one of said primary indicators may be utilized to operate one of said secondary indicators, and means associated with said groups of indicators whereby the indicators directively exposed in a group may be fully exposed to all player positions, said exposing means comprising a movable screen.

RALPH K. POTTER.